(12) United States Patent
Schmidt

(10) Patent No.: US 6,849,150 B1
(45) Date of Patent: Feb. 1, 2005

(54) SYSTEM AND METHOD OF FORMING STRUCTURAL ASSEMBLIES WITH 3-D WOVEN JOINT PRE-FORMS

(75) Inventor: Ronald P. Schmidt, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 144 days.

(21) Appl. No.: 09/761,301

(22) Filed: Jan. 16, 2001

(51) Int. Cl.$^7$ ................................................ B29C 65/00

(52) U.S. Cl. .................... 156/285; 156/293; 156/303.1; 156/307.1; 156/307.3; 156/323

(58) Field of Search ............................ 156/293, 303.1, 156/306.9, 313, 323, 306.6, 307.1, 307.3, 91, 92, 285, 286; 244/131

(56) References Cited

U.S. PATENT DOCUMENTS

| | | | |
|---|---|---|---|
| 4,671,470 A | | 6/1987 | Jonas ......................... 244/119 |
| 4,782,864 A | | 11/1988 | Abildskov ................... 139/384 |
| 4,966,802 A | * | 10/1990 | Hertzberg .................. 428/119 |
| 5,135,382 A | * | 8/1992 | Tsuchiya et al. ........... 425/330 |
| 5,533,693 A | | 7/1996 | Abildskov et al. |
| 5,944,286 A | * | 8/1999 | Morris et al. ............... 244/131 |
| 6,007,894 A | * | 12/1999 | Barnes et al. .............. 428/120 |
| 6,173,925 B1 | * | 1/2001 | Mueller et al. ............. 244/219 |
| 6,306,239 B1 | * | 10/2001 | Breuer et al. ............... 156/245 |
| 6,374,570 B1 | * | 4/2002 | McKague, Jr. ............... 52/762 |

FOREIGN PATENT DOCUMENTS

| | | | | |
|---|---|---|---|---|
| DE | 19832441 C1 | * | 1/2000 | ........... B29C/70/42 |
| EP | 0 257 148 A | | 3/1988 | |
| WO | WO 9850214 A1 | * | 11/1998 | ........... B29C/43/36 |
| WO | WO 9959802 A1 | * | 11/1999 | ........... B29C/70/30 |

OTHER PUBLICATIONS

Leaversuch R: *Electron–Beam Treatment Upgrades a Range of High–Volume Materials*, Modern Plastics International, McGraw–Hill, Inc. Lausanne, CH.

*Tension Pull–Off and Shear Test Methods to Characterize 3–D Textile Reinforced Bonded Composite Tee–Joints*; Owens et al., published 2000 Composite Structures, Theory and Practice, Editors: Peter Grant and Carl Q. Rosseau.

*Primary Sandwich Structure, A Unitized Approach*; Sheahen et al.; copyright 2000 by Lockheed Martin; Published by the American Institute of Aeronautics and Astronauts, Inc.; pp. 1–8.

*Robust Composite Sandwich Structures*; Sheahen et al.; copyright 1998 by Lockheed Martin; Published by the American Institute of Aeronautics and Astronauts, Inc.; pp. 1–12.

*Affordable Composite Structured for Next Generation Fighters*; Bersuch et al.; copyright 1998 by Lockheed Martin; published by Society for the Advancement of Material and Process Engineering; pp. 1–11.

*Interlaminar Reinforced Composites Development for Improved Damage Tolerance*; Wanthal et al; copyright 2000 by the Boeing Company; Lockheed Martin; Northrop Grunman; Society for the Advancement of Material and Process Engineering; 15 pages.

(List continued on next page.)

Primary Examiner—Gladys J P Corcoran
(74) Attorney, Agent, or Firm—Bracewell & Patterson, L.L.P.

(57) ABSTRACT

A system and method for forming structural assemblies with 3-D woven joint pre-forms. The method of the present invention forms complex structural assemblies with pre-formed structures. Adhesive is applied between the preformed structures and uncured 3-D woven textile pre-forms. Then together the preformed structures and uncured resin impregnated 3-D woven textile are cured with heat and/or pressure to form the larger complex structural assemblies.

14 Claims, 7 Drawing Sheets

OTHER PUBLICATIONS

*3–D Composites in Primary Aircraft Aircraft Structure Joints*;; Bersuch et al.; published Jan. 1997 AGARD Bolted/Bonded Joints in Polymeric Composites; pp. 16–1–16–10.

*Affordable 3–D Integrated Composite Structures*; Sheahen et al.; copyright 2000 by Lockheed Martin; published by the Universal Technology Corporation; 20 pages.

* cited by examiner

Fig. 4
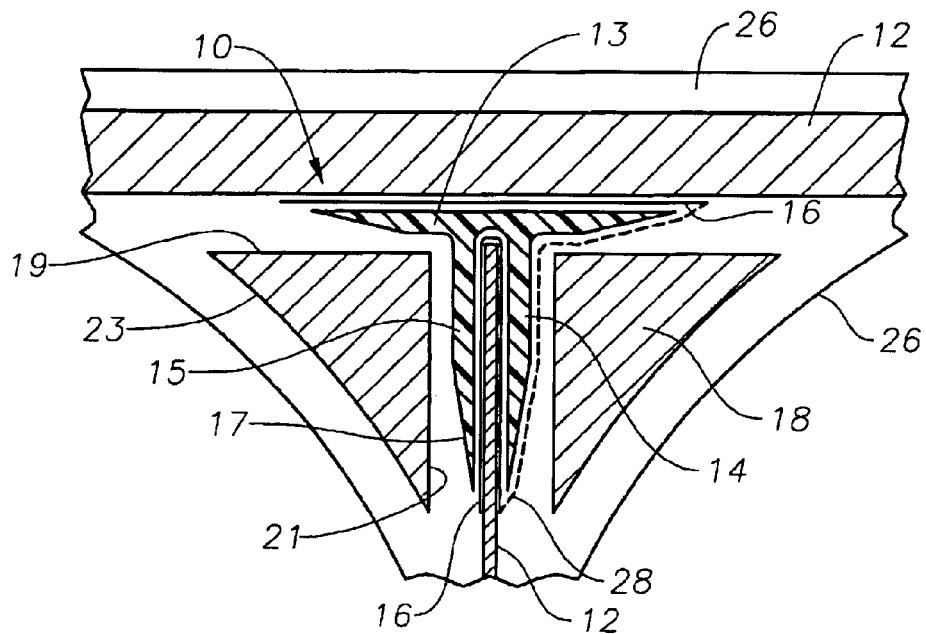
Fig. 5
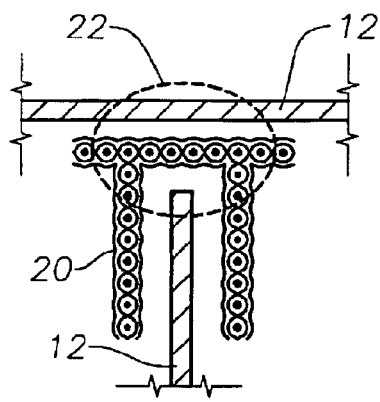
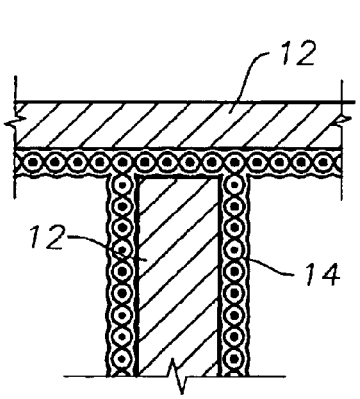
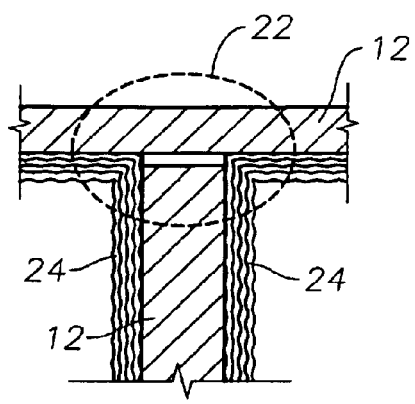
Fig. 6A  Fig. 6B
(Prior Art)

SYSTEM AND METHOD OF FORMING STRUCTURAL ASSEMBLIES WITH 3-D WOVEN JOINT PRE-FORMS

This invention was made with Government support under Contract Number F3361594C3210 awarded by The Department of the Air Force. The Government has certain rights in this invention.

TECHNICAL FIELD OF THE INVENTION

The present invention relates generally to systems and methods for fastening sub-assemblies in the formation of larger more complex structures, and more particularly, a system and method for co-bonding structural sub-assemblies with 3-D woven textile pre-forms.

BACKGROUND OF THE INVENTION

Conventional composite structural joints (co-cured, bonded or bolted) are severely limited in out of plane load capacity (as generated by fuel pressure loads in a wing box or kick loads at structural discontinuities). Joint out of plane loads cause high peel stresses and interlaminar stresses in conventional 2-D laminated composite joints as shown in FIGS. 1A–1E.

Typical composite resins have good tension and shear strengths, but very low peel strength.

Significant composite joint improvements were developed as far back as 1974 by using 3-D hand woven textile joint inserts in co-cured wing to span joints. However, due to high cost of the hand woven textiles, this technology was not used until the early 1990s when the F-2 program automated weaving of the deltoid insert shown in FIG. 2.

This 3-D woven insert is primarily used as a radius filler on the lower wing skin to spar co-cured joints. While strength is increased, this application is still limited by expensive tooling and processing required for co-cure fabrication of the F-2 composite wing. Also, the joint is still prone to delaminating up the middle.

The Beech Starship utilized another from of 3-D joint as shown in FIG. 3. This joint utilized sandwich materials, therefore co-curing the entire structure would have been very difficult. Beech opted to precure the detail parts and secondarily bond them together. While this approach worked, it was still fairly load limited and had disadvantages common to secondary bonding (fitup of pre-cured piece to piece). This particular design was also limited to sandwich structures.

The NASA ACT (Advanced Composites Technology) program worked on entire structures that were 3-D woven, knitted, braided or stitched together. While these designs may have benefits in damage tolerance and joint strengths, there are severe limitations. Knitted, braided, stitched and 3-D woven structures typically have out of plane properties that are superior to conventional 2-D structures (made out of fabric and tape), however their in plane properties are generally much lower. This leads to weight penalties when the 3-D materials are used for wing skins, spar or bulkhead webs, fuselage skins, et cetera, that typically have high in plane loads. Also, complex geometry limits use of totally woven or stitched together structures due to machine and processing limitations.

The present invention generally uses conventional composite tape, fabric and/or metal details for structural skins, spar and bulkhead webs, fittings et cetera. Conventional laminates are used where high in plane properties are desired. Many different material combinations are possible such as RTM details, thermoplastic details, fiberglass, BMI, etc. The most cost effective process of fabricating the details can be used, in example, a tape laid, platten press cured, waterjet trimmed spar web. The finished details are located with uncured, resin infused 3-D woven connectors (preforms) and adhesive in between the parts in a simple assembly jig or with self locating tooling features (tooling tabs or pins, etc.) Simple compliant overpresses are then placed over the weaves. The assembly is then vacuum bagged and cured, typically with heat and/or pressure, or E-beam processed to avoid thermal effects. It is also possible to assemble structures with room temperature cure systems (wet layup).

The use of these advanced 3-D woven connectors combined with the co-bond process produces low cost, robust, composite structural joints not obtainable with other prior art. Simple, inexpensive, compliant overpresses can be used since the uncured 3-D textile connector forms against the cured detail parts during processing. This method avoids the precision tools required for co-cure (where all the parts are uncured) or the precise fit up required with secondary bonding (where multiple cured parts are brought together with a thin layer of adhesive in between).

Fabrication of the 3-D woven preforms is conducted on fully automated looms which allows cost effective, high quality, repeatable connectors. Once fabricated into a structure, the 3-D woven connector behaves similar to a fitting in between the detail parts transferring load in shear and tension, not peel.

SUMMARY OF THE INVENTION

The present invention provides a co-bonded structural assembly for composite materials that substantially eliminates or reduces disadvantages and problems associated with previously developed systems and methods used for bonding composite materials.

More specifically, the present invention provides a system and method of forming structural assemblies with 3-D woven joint pre-forms. The method of the present invention forms complex structural assemblies using pre-cured detail parts with the 3-D woven joint pre-form. Adhesive is applied between the preformed structures and uncured 3-D woven textile pre-forms. Then together the pre-cured structures and uncured resin impregnated 3-D woven textile are cured with heat and/or pressure to form the larger complex structural assemblies.

The present invention provides an important technical advantage over prior systems and methods of forming complex composite structures. The present invention provides a robust joint between two pre-cured composites or metallic sub-assemblies. By simultaneously co-bonding sub-assemblies to 3-D woven textile pre-forms structural strength is increased.

Additionally, the present invention provides another important technical advantage by eliminating the need for expensive tooling and fine tolerances to achieve uniform bondlines critical for structural performance.

Yet another technical advantage provided by the present invention is that pressure intensifiers or overpresses used can be inexpensively manufactured as an exact fit is not required as is needed by conventional bonding or co-curing.

Additionally, the present invention provides another important technical advantage by forcing uncured 3-D preforms to conform to the sub-assemblies or pre-cured details. This allows the flexible uncured 3-D woven textile preforms to be forced against adjacent sub-assemblies thus conforming to severe contours and angles.

Yet another technical advantage provided by the present invention is that the 3-D woven textile pre-forms provide a structural strength that cannot be matched with a conventional 2-D textile composite material joints. Fibers are woven into load bearing directions of intersections between sub-assemblies. Thus forming a textile flange that "fits" the 3-D woven textile pre-form to the sub-assemblies. Thus the present invention creates a joint with predominantly shear and tension loads when the web sub-assembly is loaded normal to the skin sub-assembly. Furthermore, peel forces are substantially reduced. These peel forces are a major problem associated with bonded assemblies.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 4 depicts a structural assembly or part of the present invention;

FIG. 5 illustrates fibers woven in load bearing directions in the cross-section of a textile flange between two sub-assemblies;

FIGS. 6A and 6B illustrate the lack of fibers in the intersection zone when a 2-D textile is employed;

DETAILED DESCRIPTION OF THE INVENTION

Figure 1A:
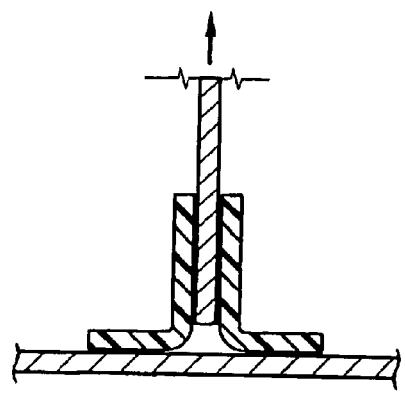
FIGS. 1A–1E depict prior art solutions.
Figure 1B:
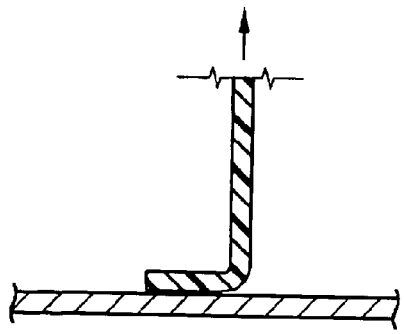
Figure 1C:
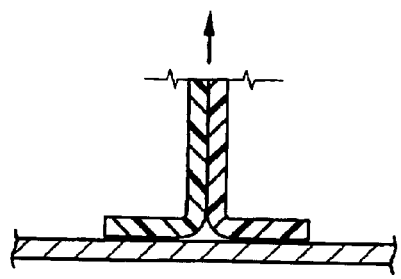
Figure 1D:
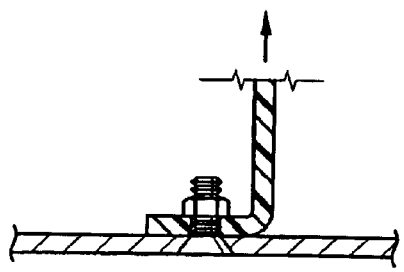
Figure 1E:
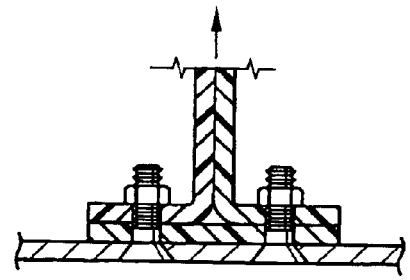
Figure 2:
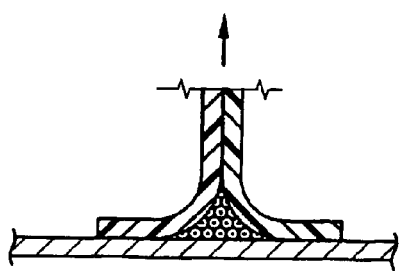
FIG. 2 depicts a second prior art solution.
Figure 3:
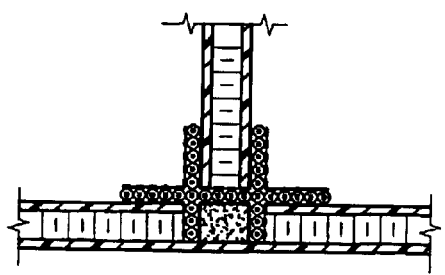
FIG. 3 depicts yet another prior art solution.
Figure 7A:
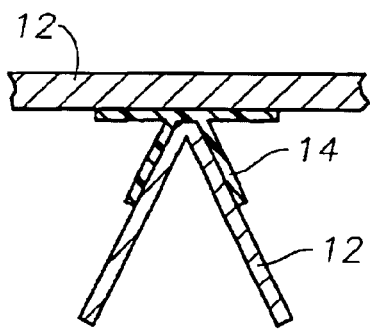
FIGS. 7A, 7B, 7C and 7D depict different configurations of woven textile pre-forms and joints.
Figure 7B:
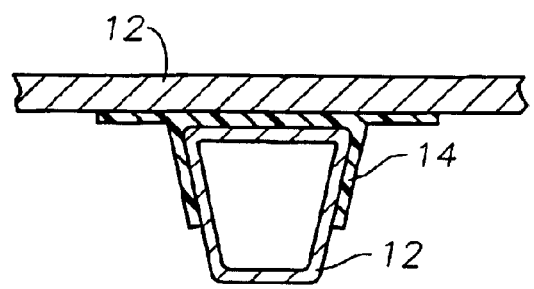
Figure 7C:
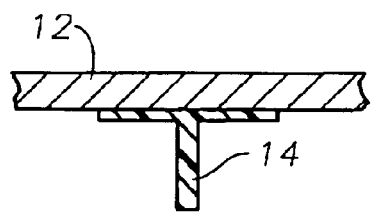
Figure 7D:
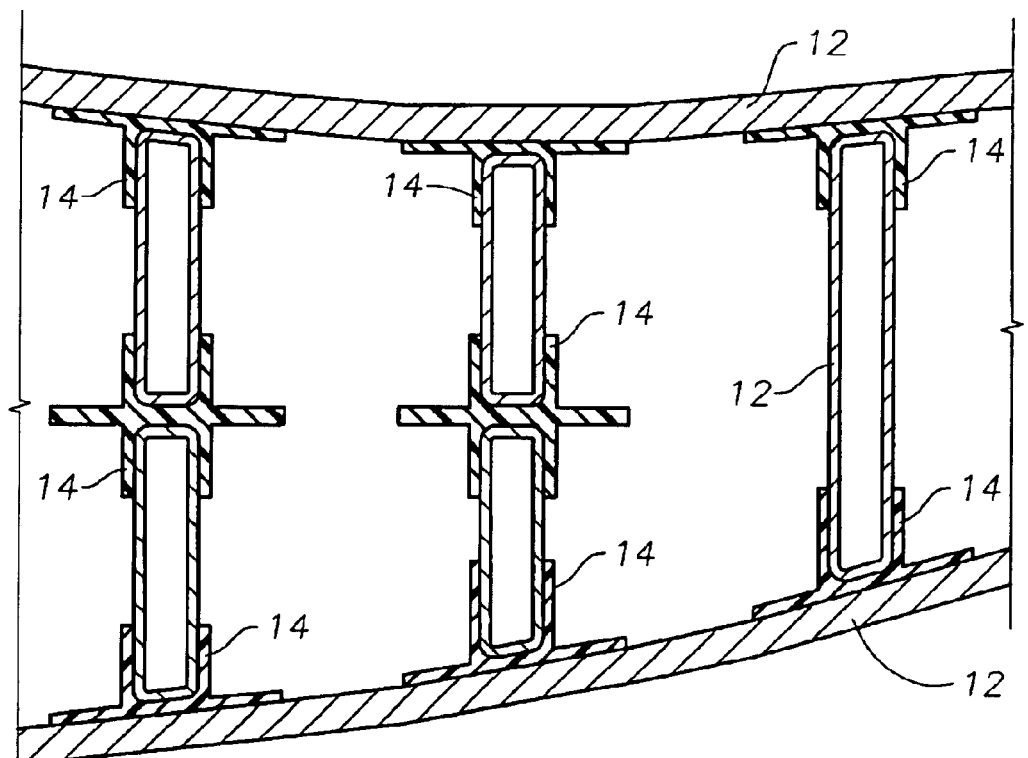

Preferred embodiments of the present invention are illustrated in the FIGUREs, like numerals being used to refer to like and corresponding parts of the various drawings.

The present invention provides a unique method of assembling structural components as illustrated by FIG. 4. FIG. 4 depicts a structural assembly or part 10. This assembly is formed by various sub-assemblies 12. Subassemblies 12 are typically pre-cured laminated composite structures or metallic structures. Additionally, subassemblies 12 can be constructed from honeycomb sandwich structures or solid monolithic structures. However, the present invention need not be limited to this material type for sub-assemblies 12, other material types such as graphite, fiberglass, metals, Kevlar, and the like, as known to those skilled in the art can be used.

In the most general application, structural assembly 10 is formed by coupling at least one sub-assemblies 12 with an uncured pre-form 14 in a curing process. In one embodiment of the present invention, pre-form 14 is a 3-D woven textile impregnated with an uncured resin. Preform 14 has a base 13 and two legs 15 extending perpendicular to base 13. Base 13 and legs 15 have tapered edges 17. Additionally, an adhesive film 16 can be placed between the sub-assemblies 12 and uncured pre-form 14. The adhesive layer can be incorporated into the resin impregnating the 3-D woven textile. However, self-adhering resin systems typically do not have the same properties.

Structural assembly 10 is formed when sub-assemblies 12 and pre-form 14 are cured in place. This creates a robust joint between two pre-cured composites or metallic sub-assemblies 12. By simultaneously co-bonding sub-assemblies 12 to pre-form 14, fiber waviness in sub-assemblies 12, which seriously reduces structural strength, can be avoided. Additionally, the process avoids matching a cured composite structure to a cured sub-assembly, which requires expensive tooling and fine tolerances to achieve uniform bondlines that are critical for structural performance.

Curing in place allows compliant pressure intensifiers 18 to force the flexible uncured woven pre-form 14 against adjacent sub-assemblies 12 thus conforming to severe contours and angles. Additionally, the compliant pressure intensifiers 18 can be inexpensively manufactured as exact fit is not required since the uncured pre-forms 14 can conform to the sub-assemblies 12. Each pressure intensifier 18 is a three-sided polygon in the cross-section shown in FIG. 4, defining a triangular configuration. Each pressure intensifier 18 has a straight base side 19 that contacts base 13. A straight leg side 21 contacts the exterior surface of pre-form leg 15. An exterior side 23 joins the edges of base side 19 and leg side 21. Exterior side 23 is preferably concave.

The leg sides 21 of each pressure intensifier 18 are longer than pre-form legs 15, as shown in FIG. 4. The base side 19 of each pressure intensifier 18 is longer than each portion of base 13 of each pre-form 14 extending from one of the pre-form legs 15 to one of the ends of base 13. Because each base side 19 and each leg side 21 is a straight surface in a single plane and each tapered end section 17 tapers in thickness, a clearance will exist between each tapered end section 17 and each pressure intensifier 18 prior to evacuating vacuum bag 26.

Additionally, the 3-D pre-form 14 of the present invention is unique. Historically, 2-D textiles have been used to create joints between composite materials. The 3-D textile provides structural strength that cannot be matched with a conventional 2-D composite material. The 3-D textile has fibers 20 woven into load bearing directions of intersection zone 22. These fibers are illustrated in the cross-section of a textile flange presented in FIG. 5. Thus a textile flange "fits" the 3-D pre-form 14 to subassemblies 12. Adhesives and resins generally have high tensile and shear strengths but low peel strengths. The 3-D textile pre-form of the present invention creates a joint with predominantly shear and tension loads when the web sub-assembly is loaded normal to the skin surface. Cross-sections comparing these 3-D and 2-D textiles are provided in FIGS. 6A and 6B to illustrate the lack of fibers in the intersection zone 22 when a 2-D textile 24 is employed.

Several potential embodiments of 3-D pre-form 14 are provided in FIGS. 7A, 7B, 7C, and 7D. However, it should be noted that the present invention is not limited to the 3-D textile structures provided in FIGS. 7A–7D rather these are provided for illustration purposes only and any 3-D structure may be used.

Figure 8:
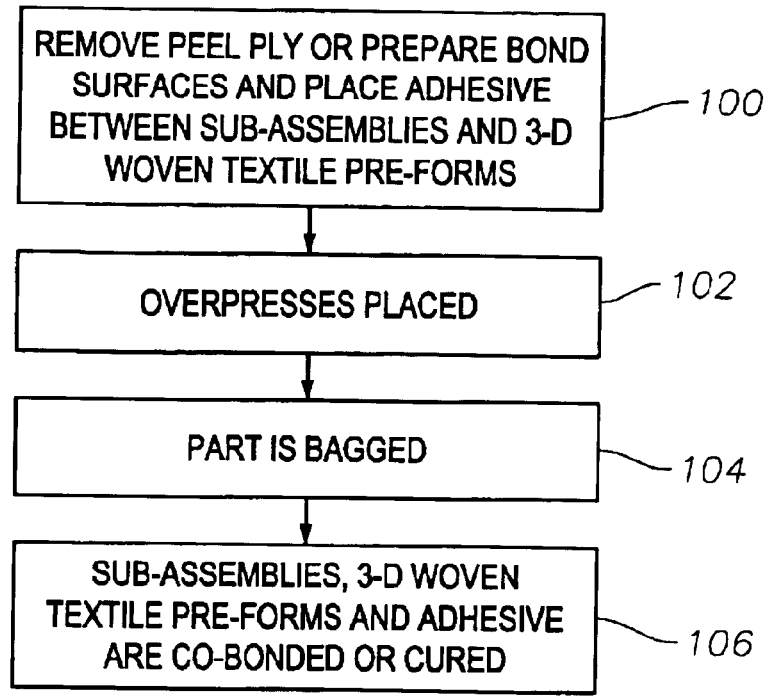
FIG. 8 provides a flow chart illustrating the method of the present invention.

A flow chart illustrating one method for constructing assemblies 10 according to the present invention is provided in FIG. 8. Beginning with step 100, an adhesive film 16, illustrated in FIG. 4, is placed between the sub-assemblies 12 and 3-D woven textile pre-form 14. In step 102, compliant overpresses 18 are located over the exposed textiles 14.

In step 104, a vacuum bag 26 is placed outside the overpresses 18. Assembly 10 comprising the sub-assemblies 12 and 3-D woven textile pre-form 14 and adhesive 16 is then cured to form a single rigid structure in step 106. Typically, this cure is performed through the use of heat and/or pressure. In the instance where pressure is used, pressure intensifiers 18 are located proximate to the sub-assemblies 12 and said 3-D woven textile pre-form 14. An advantage associated with the pressure intensifiers of the present invention is that they may be formed inexpensively from a flexible material such as silicone rubber using molds made with stereo lithographic processes.

The entire assembly 10 can be placed within a vacuum bag 26. As the vacuum is drawn within vacuum bag 26, a uniform force is applied evenly to all the surfaces of assembly 10. This eliminates the need for expensive and specialized tooling to compress and hold assembly 10 during the curing process. This pressure uniformly forces the weave of flexible uncured 3-D woven textile pre-form 14 against the contours of sub-assemblies 12 ensuring uniform bondlines and avoiding fiber waviness which reduces structural strength.

Alternatively, the adhesive film and uncured 3-D woven textile pre-form can be cured using an E-Beam cure resin system instead of heat.

Figure 9A:
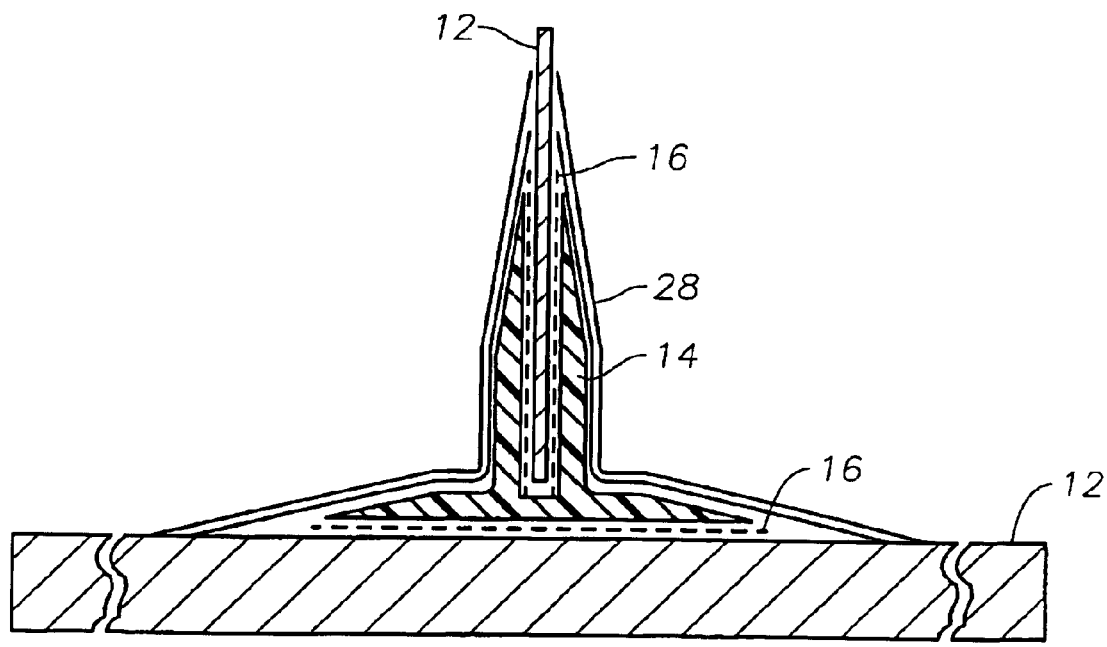
FIGS. 9A, 9B, 9C and 9D depict a structural assembly or part of the present invention with overwrap plies applied to the exterior surface of the structural assembly.

To add additional strength to assembly 10, overwrap plies 28, as shown in FIG. 9A can be applied on exterior surfaces of the 3-D woven textile preform 14 and sub-assemblies 12 prior to cure 106.

Figure 9B:
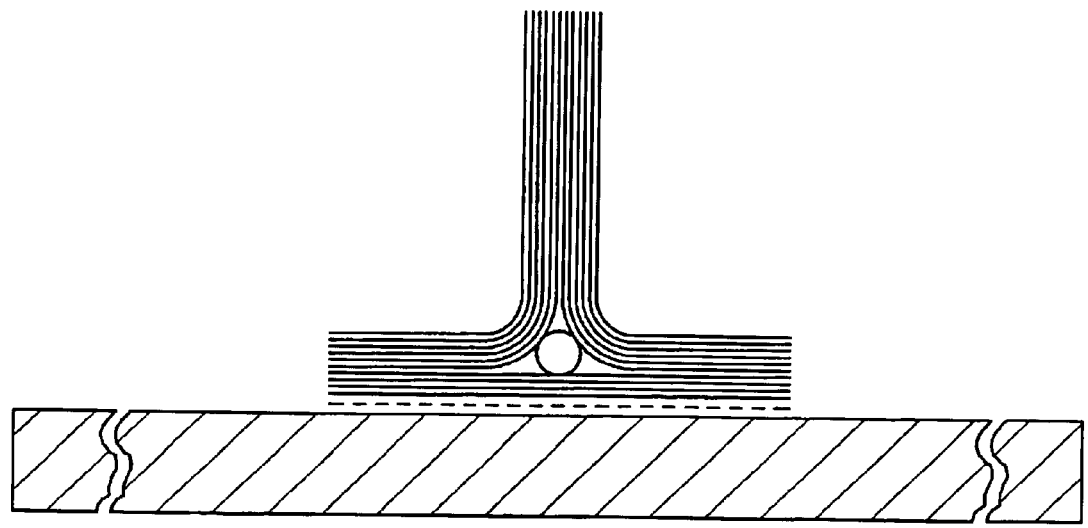

FIG. 9B illustrates a typical baseline blade fabricated by conventional methods without a woven preform.

Figure 9C:
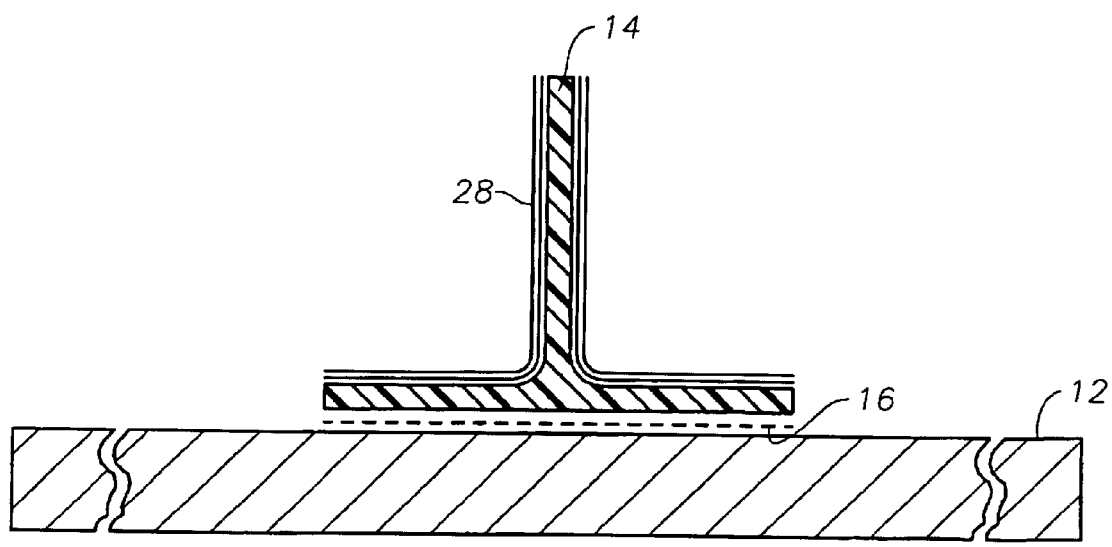
Figure 9D:
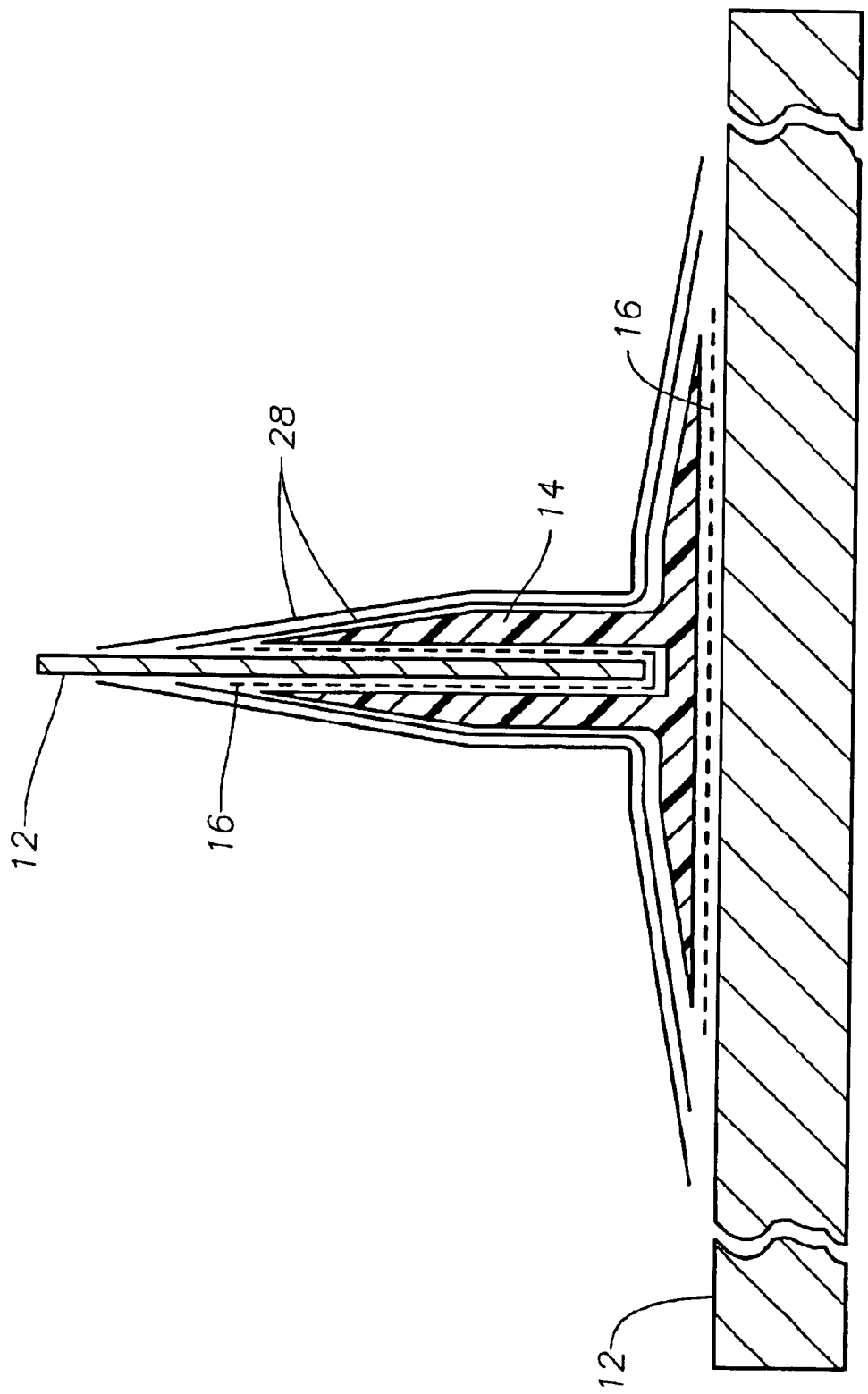

FIGS. 9C and 9D illustrate the co-bond process utilizing a graphite "T" pre-form and a graphite "TT" or Pi-shaped pre-form.

Pressure is applied to hold the sub-assemblies 12 and pre-forms 14 together. This may be accomplished through the application of overpresses and vacuum bagging or clamping the sub-assemblies 12 and pre-forms 14. Many resin systems require pressure beyond that obtainable with a vacuum bag so an autoclave is used to supplement the vacuum bag Stereo lithography allows the pressure intensifiers or overpresses to be formed from CAD-generated solid or surface models. The designed overpresses emerges as a solid three-dimensional part without the need for tooling.

The process of taking tooling from original conception through all of the required necessary phases prior to implementation in a manufacturing environment, is both time consuming and costly. Since the amount of time that it takes to actually reach the production/manufacturing phase of a product can be directly measured in dollars and cents. Reducing this time makes the manufacturing process both more efficient and more profitable. CAD software is used as a method to define both the geometry and the dimensional requirements of the overpresses. The data from this CAD file is then electronically transmitted to a stereo lithography system. There are several different types of stereo lithography systems available, each utilizing its own distinct process depending on such factors as required model accuracy, equipment cost, model material, type of model, and probably most important modeling time. One such stereo lithography apparatus consists of a vat of a liquid polymer in which there is a movable elevator table/platform capable of moving (lowering) in very precise increments depending on the requirements defining the type of model that is to be constructed. A helium/cadmium laser is then used to generate a small but intense spot of ultraviolet light which is used to move across the top of the vat of liquid polymer by a computer controlled optical scanning system. At the point where the laser and the liquid polymer come into contact, the polymer is changed into a solid. As the laser beam is directed across an xy surface, the model is formed as a plastic object point by point and layer by layer as true as is allowed by the type of photopolymer that is being used in all three dimensions: x, y, and z. As each layer is formed, the elevator platform is then lowered so that the next layer can be scanned in. As each additional layer is formed, it then bonds to the previous one and the resulting object is generated by a precise number of successive layers.

At the end of this process, the object can then be removed from the support structure and finished by any number of methods until the surface finish is of the texture that is required. The object can than be used as either a negative or positive mold to form the overpresses from a flexible material. Alternatively, if the polymer from which the object is constructed has the desired material properties, it can be used directly as the pressure intensifier or overpress.

Stereo lithography is capable of holding tight tolerances to 0.005, and even finer tolerances are possible by finish machining or precision grinding of the finished object. Complex shapes and geometry of the produced objects is virtually limited only by ones imagination.

Figure 10:
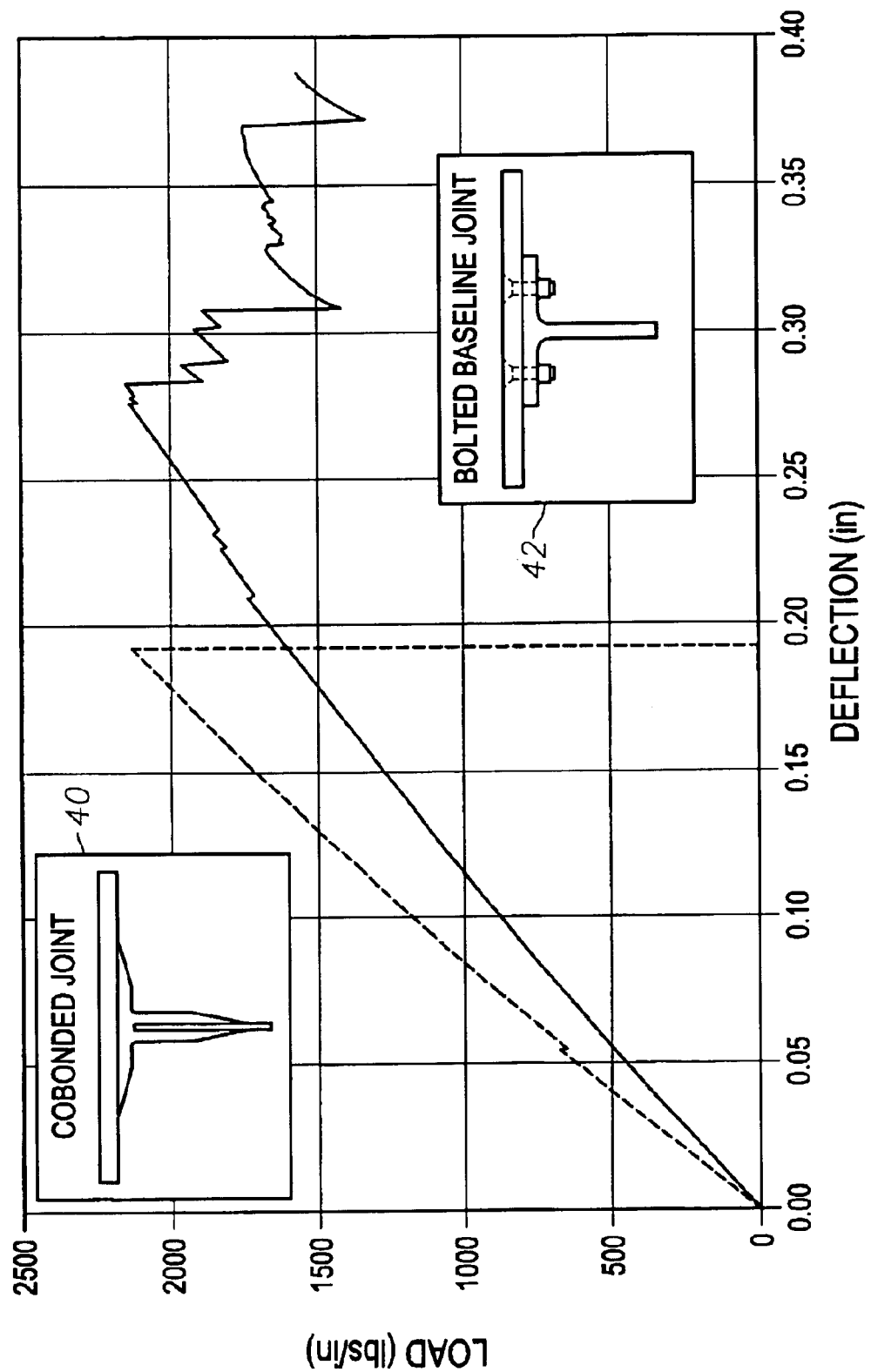
FIG. 10 graphically illustrates the load failure of structural assemblies of the present invention as compared to a baseline prior art system.

FIG. 10 depicts the comparable strength of the co-bonded all composite joint of the present invention as compared to a bolted baseline joint with an aluminum frame as provided by the prior art. As one can see the Co-bonded joint 40 achieves approximately the same load as the baseline joint 42 prior to failure. Typical all composite joints carry approximately ⅓ of this load level. Matching the strength of bolting to an aluminum frame has not been accomplished before using prior art methods.

The present invention provides an important technical advantage over prior systems and methods of forming complex composite structures. The present invention provides a robust joint between two pre-cured composites or metallic sub-assemblies. By simultaneously co-bonding sub-assemblies to 3-D woven textile pre-forms, fiber waviness, which seriously reduces structural strength, can be avoided.

Additionally, matching a cured composite structure to a sub-assembly typically requires expensive tooling and fine tolerances to achieve uniform bondlines that are critical for structural performance. The pressure intensifiers or overpresses used by the present invention can be inexpensively manufactured as exact fit is not required as is needed by secondary bond processes since the uncured pre-forms conform to the sub-assemblies.

Curing in place allows the weave of flexible uncured 3-D woven textile pre-forms to be forced against adjacent sub-assemblies thus conforming to severe contours and angles. Additionally, pressure intensifiers can be inexpensively manufactured, since an exact fit is not required as is needed by pre-cured pre-forms as the uncured pre-forms conform to the sub-assemblies. Thus the expensive costs and tight tolerances associated with pre-cured pre-forms can be avoided.

Additionally, the 3-D woven textile pre-form of the present invention is unique providing a structural strength and damage tolerance that cannot be matched with a conventional 2-D textiles composite material joint. The 3-D textile has fibers woven into load bearing directions of intersections between sub-assemblies. Thus forming a textile flange that "fits" the 3-D woven textile pre-form to the sub-assemblies. Thus the present invention creates a joint with predominantly shear and tension loads when the web sub-assembly is loaded normal to the skin surface.

In summary, the present invention provides a system and method of forming structural assemblies with 3-D woven joint pre-forms. The method of the present invention forms complex structural assemblies with pre-cured composite or metal structures. Adhesive is applied between the pre-cured structures and uncured 3-D woven textile pre-forms. Then together the pre-cured structures and uncured resin impregnated 3-D woven textile are cured with heat and/or pressure to form the larger complex structural assemblies.

Although the present invention has been described in detail, it should be understood that various changes, substitutions and alterations can be made hereto without departing from the spirit and scope of the invention as described by the appended claims.

What is claimed is:

1. A method of forming a structural assembly, comprising the step of:
    affixing a first pre-cured assembly to a 3-D woven textile pre-form impregnated with an uncured resin, an adhesive film being located between said first pre-cured assembly and said pre-form, said pre-form having a base and first and second legs extending from the base, the base having first and second ends having tapered sections that are tapered in thickness, and the first and second lees having ends that have tapered sections that are tapered in thickness, said first pre-cured assembly being located on a side of the base opposite the first and second legs;
    affixing a second pre-cured assembly between said first and second legs of said 3-D woven textile pre-form with an additional adhesive film being located between said second pre-cured assembly and inner surfaces of said first and second legs of said pre-form;
    curing said resin and said adhesive films to form the structural assembly; wherein
    said curing is performed by placing a leg side of a first pressure intensifier of flexible material against an exterior surface of said first leg and placing a base side of said first pressure intensifier against said base, said leg side of said first pressure intensifier extending past aim end of said first leg, and said base side of said first pressure intensifier extending past a first end of said base, and placing a leg side of a second pressure intensifier of flexible material against an exterior surface of said second leg and placing a base side of said second pressure intensifier against said base, said leg side of said second pressure intensifier extending past an end of said second leg, and said base side of said second pressure intensifier extending past a second end of said base, each of said pressure intensifiers having an exterior side that extends from an edge of said base side to an edge of said leg side,
    inserting said first and second pre-cured assemblies along with said pre-form, adhesive films, and pressure intensifiers into a vacuum bag, then evacuating the vacuum bag, causing the pressure intensifiers to press said base and legs of said pre-form against portions of said pre-cured assemblies; and wherein each of said leg sides and each of said base sides of said first and second pressure intensifiers are straight surfaces located in a single plane and spaced from said tapered sections prior to evacuating the vacuum bag.

2. The method of claim 1, wherein said step of curing is implemented with heat and pressure.

3. The method of claim 1, wherein said exterior side of each of said pressure intensifiers is concave.

4. The method of claim 1, wherein said step of curing is implemented with an E-Beam resin system.

5. The method of claim 1, further comprising the step of applying a composite overwrap ply on said exterior surfaces of said legs of said pre-form prior to pressing said leg sides of said pressure intensifiers against said legs.

6. The method of claim 1, wherein said pressure intensifiers are rubber.

7. The method of claim 1, wherein said base side and said leg side of each of said pressure intensifiers are at right angles to each other, and each of said pressure intensifiers is triangular in cross section.

8. A method of forming structural assemblies with pre-cured laminated composite structures, comprising the steps of:
    providing a woven textile pre-form with a base and a pair of legs extending from the base at a 90 degree angle, the pre-form being impregnated with an uncured resin, said base having first and second portions extending from said first and second legs, respectively, said first and second portions of said base and said legs having tapered end sections that taper in thickness;
    affixing a first adhesive film between a first pre-cured laminated composite structure and the base of the pre-form;
    affixing an additional adhesive film between a second pre-cured laminated composite structure and inner surfaces of said first and second legs of said woven textile pre-form; then
    providing flexible first and second pressure intensifiers, each being triangular in cross section, said first pressure intensifier having a base side located in a single plane that has a length greater than a length of said first portion of said base and a leg side located in a single plane that has a length greater than a length of said first leg, said second pressure intensifier having a base side located in a single plane that has a length greater than a length of said second portion of said base and a leg side located in a singe plane that has a length greater than a length of said second leg, and placing said base side of said first pressure intensifier in contact with said first portion of said base and said leg side of said first pressure intensifier in contact with an exterior surface of said first leg and said base side of said second pressure intensifier in contact with said second portion of said base and said leg side of said second pressure intensifier in contact with an exterior surface of said second leg; then
    enclosing said first and second pre-cured laminated composite structures, said pre-form and said pressure intensifiers within a vacuum bag and evacuating the bag; then
    curing said adhesive films and said woven textile pre-form to form the structural assemblies; and wherein
    prior to evacuating the bag, a clearance exists between said base side of said first pressure intensifier and said tapered end section of said first portion of said base and between said leg side of said first pressure intensifier and said tapered end section of said first leg, and a ance exists between said base side of said second pressure intensifier and said tapered end section of said second portion of said base and between said leg side of said second pressure intensifier and said tapered end section of said second leg.

9. The method of claim 8, wherein said step of curing is implemented by heating the vacuum bag.

10. The method of claim 8, wherein said step of curing is implemented with an E-Beam cure resin system.

11. The method of claim 8, further comprising the step of applying a composite overwrap ply on said exterior surfaces of said legs of said pre-form.

12. The method of claim 8, wherein said pressure intensifiers are formed of rubber.

13. The method of claim 8, wherein each of said pressure intensifiers has an exterior side that is concave.

14. A method of forming structural assemblies with pre-cured laminated composite structures, comprising the steps of:

provided a woven textile pre-form with a base and first and second legs extending from the base at an angle, defining a slot between them and corners at intersections of the legs and the base having a first portion extending from the first leg and a second portion extending from the second leg, the first and second portions and first and second legs having tapered end sections that taper in thickness, the pre-form being impregnated with an uncured resin;

affixing a first adhesive film between a pre-cured laminated composite first structure and the base of the pre-form on a side opposite the legs;

inserting a pre-cured laminated composite second structure into the slot with an additional adhesive film between inside surfaces of the legs and the second structure;

providing a pair of flexible pressure intensifiers, each of the pressure intensifiers being a three-sided polygon in cross-section, having two straight inner sides intersecting each other, defining a corner portion, and an exterior side that extends diagonally between edges of the inner sides, and placing the corner portion of each in contact with one of the corners formed by the base and the legs, the inner sides of each of the pressure intensifiers extending past the tapered end sections and defining clearances between the tapered end sections and the inner sides for each of the pressure intensifiers; then inserting the first and second structures, along with the pre-form, adhesive films and pressure intensifiers into a vacuum bag; and evacuating the vacuum bag and applying heat to cure said adhesive films and pre-form to form the structural assemblies.

* * * * *